US012734738B2

(12) United States Patent
Nesaki et al.

(10) Patent No.: US 12,734,738 B2
(45) Date of Patent: Sep. 15, 2026

(54) MOLD DEVICE AND INJECTION MOLDING SYSTEM

(71) Applicant: SUMITOMO HEAVY INDUSTRIES, LTD., Tokyo (JP)

(72) Inventors: Yuta Nesaki, Chiba (JP); Yasuo Suzuki, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 2 days.

(21) Appl. No.: 19/180,336

(22) Filed: Apr. 16, 2025

(65) Prior Publication Data

US 2026/0158720 A1 Jun. 11, 2026

(30) Foreign Application Priority Data

Apr. 22, 2024 (JP) ................................ 2024-069341

(51) Int. Cl.
*B29C 45/73* (2006.01)
*B29C 45/17* (2006.01)
*B29C 45/27* (2006.01)
*B29C 45/46* (2006.01)

(52) U.S. Cl.
CPC .......... *B29C 45/46* (2013.01); *B29C 45/1742* (2013.01); *B29C 45/27* (2013.01); *B29C 45/73* (2013.01); *B29C 45/7312* (2013.01)

(58) Field of Classification Search
CPC ................ B29C 45/73; B29C 45/7312; B29C 2045/1709; B29C 45/46
See application file for complete search history.

(56) References Cited

U.S. PATENT DOCUMENTS 6,840,115 B1 * 1/2005 Ishikawa ............. B29C 45/7653 425/135
2005/0191379 A1 * 9/2005 Ito ........................ G05B 19/414 425/149
2006/0193935 A1 * 8/2006 Konno .............. G05B 19/4062 425/136
2007/0108668 A1 * 5/2007 Hutchinson ............. B29C 33/04 425/DIG. 246

(Continued)

FOREIGN PATENT DOCUMENTS

JP H10-315292 12/1998
JP 2005-074700 3/2005

(Continued)

*Primary Examiner* — Andrew D Graham
(74) *Attorney, Agent, or Firm* — IPUSA, PLLC

(57) ABSTRACT

A mold device includes a fixed mold and a movable mold. Cavity space is formed between the molds when clamped together. The fixed mold includes: a first mold piece that, upon clamping of the molds, contacts the movable mold and forms part of a wall surface of the cavity space; a first cooling part adjusted to lower temperature than the first mold piece; and a first support part movably supporting one of the first cooling part and the first mold piece relative to the other one. The movable mold includes: a second mold piece that, upon clamping of the molds, contacts the fixed mold and forms part of the wall surface; a second cooling part adjusted to lower temperature than the second mold piece; and a second support part movably supporting one of the second cooling part and the second mold piece relative to the other one.

6 Claims, 5 Drawing Sheets

(56) References Cited

U.S. PATENT DOCUMENTS

2008/0150190 A1* 6/2008 Takigawa .............. B29C 45/561 425/593
2008/0211126 A1* 9/2008 Kobayashi .......... B29C 45/7653 264/40.5
2008/0233227 A1* 9/2008 Onishi .................... B29C 45/17 310/68 B
2009/0057955 A1* 3/2009 Hirata ................... B29C 33/424 425/111
2009/0208600 A1* 8/2009 Akamatsu ............... B29C 45/74 425/144
2009/0243131 A1* 10/2009 Tanaka .................. G01L 5/0076 425/149
2010/0055225 A1* 3/2010 Hirata ..................... B29C 45/37 264/219
2011/0069361 A1* 3/2011 Jun ..................... B29C 45/2642 359/2
2013/0251836 A1* 9/2013 Tokuno ................. B29C 45/768 425/150
2014/0127347 A1* 5/2014 Kawasaki ........... B29C 45/2606 425/542
2015/0246462 A1* 9/2015 Seike ........................ B29B 7/38 425/149
2016/0303786 A1* 10/2016 He ...................... B29C 45/7312
2017/0048931 A1* 2/2017 Ueno .................. H05B 3/0004
2017/0113388 A1* 4/2017 Wei ......................... B29C 33/02
2018/0154564 A1* 6/2018 Ogawa ................ B29C 45/2673
2018/0186050 A1* 7/2018 Isayama ................ B29C 45/401
2020/0001510 A1* 1/2020 Wakabayashi ...... B29C 45/7312
2020/0147846 A1* 5/2020 Vohlídal .................. B29C 33/40
2020/0171725 A1* 6/2020 Ostwald .............. B29C 45/0025
2020/0398458 A1* 12/2020 Tamoto ..................... B29B 7/90
2022/0212386 A1* 7/2022 Arita ....................... B29C 45/03
2022/0355522 A1* 11/2022 Arita ..................... B29C 45/768
2022/0371246 A1* 11/2022 Arita ....................... B29C 45/76
2023/0050316 A1* 2/2023 Hotta .................... B29C 45/766
2023/0051979 A1* 2/2023 Mizunashi .......... B29C 45/1774
2023/0053669 A1* 2/2023 Mizunashi ............ B29C 45/762
2023/0064024 A1* 3/2023 Marumoto .............. B29C 45/78
2023/0067453 A1* 3/2023 Hotta .................. B29C 45/1774

FOREIGN PATENT DOCUMENTS

JP 2008-254389 10/2008
WO 2017/056614 4/2017

* cited by examiner 800
820
810
10
823
813
822
821
811
812
120
110
822a
320
822b
310
812c
812b
812a
826
825
827
829
801
802
819
814
815
828
Z
X
Y 800
820
810
10
823
813
822
821
811
812
120
110
822a
320
822b
310
812c
812b
812a
826
825
827
829
801
802
819
814
815
828
Z
X
Y 800
820
810
10
823
813
822
821
811
812
120
110
822a
320
822b
310
812c
812b
812a
826
825
827
829
801
802
819
814
815
828
Z
X
Y 800
820
810
10
823
821a
813
822
821
811
812
120
110
822a
320
822b
310
812c
812b
812a
826
825
824
802
827
801
819
828
814
815
Z
X
Y 810
813
812
811
812a
812b
801
812c
802
814
819
815
Z
X
Y

MOLD DEVICE AND INJECTION MOLDING SYSTEM

CROSS-REFERENCE TO RELATED APPLICATION

This application claims priority to Japanese Patent Application No. 2024-069341, filed on Apr. 22, 2024, the entire contents of which are incorporated herein by reference.

BACKGROUND

1. Technical Field

The present disclosure relates to a mold device and an injection molding system.

2. Description of Related Art

In the technical field of injection molding, there may be a device including: a mold consisting of a fixed mold and a movable mold; temperature-adjustment blocks for heating or cooling the mold; and a press mechanism for the temperature-adjustment blocks. The temperature-adjustment blocks are provided in a pair, in a direction that is perpendicular to the direction in which the molds are clamped together. The temperature-adjustment blocks are pressed against (held fast to) the mold by the press mechanism in a direction perpendicular to the mold-clamping direction. By controlling the pressing force (or the force that holds the temperature-adjustment blocks and the mold together), the temperature of the mold can be controlled.

SUMMARY

According to an embodiment of the present disclosure, a mold device includes a fixed mold and a movable mold, and, when these molds are clamped together, a cavity space is formed between the fixed mold and the movable mold. The cavity space is a space to be filled with a pre-heated molding material. The fixed mold includes: a first mold piece that, when the fixed mold and the movable mold are clamped together, contacts the movable mold and forms a part of a wall surface of the cavity space; a first cooling part that is adjusted to a temperature lower than a temperature of the first mold piece observed at the time of injecting the molding material into the cavity space; and a first support part that movably supports one of the first cooling part and the first mold piece relative to the other one of the first cooling part and the first mold piece. The first cooling part and the first mold piece are movable relative to each other, in both mold opening and closing directions, between positions at which the first cooling part and the first mold piece are spaced apart and positions at which the first cooling part and the first mold piece are in contact with each other. The movable mold includes: a second mold piece that, when the fixed mold and the movable mold are clamped together, contacts the fixed mold and forms a part of the wall surface of the cavity space; a second cooling part that is adjusted to a temperature lower than a temperature of the second mold piece observed at the time of injecting the molding material into the cavity space; and a second support part that movably supports one of the second cooling part and the second mold piece relative to another one of the second cooling part and the second mold piece. The second cooling part and the second mold piece are movable relative to each other, in both of the mold opening and closing directions, between positions at which the second cooling part and the second mold piece are spaced apart and positions at which the second cooling part and the second mold piece are in contact with each other.

DETAILED DESCRIPTION

A mold device heretofore includes a fixed mold and a movable mold. When these molds are clamped together, a cavity space is formed between the fixed mold and the movable mold. The cavity space is a space to be filled with a pre-heated molding material. The molding material in the cavity space is cooled down and solidified, and thereupon a molded article is obtained.

If the temperature of the mold device is too low, the fluidity of the molding material when it is injected is poor, which makes it difficult to transfer the shape and dimensions of the cavity space to the molded article. In other words, if the temperature of the mold device is too low, the mold device suffers poor transfer performance. On the other hand, if the temperature of the mold device is too high, this makes it difficult for the molding material in the cavity space to cool down. It then takes the molding material too long to cool down to a point where it can be removed from the mold device, resulting in poor productivity of molded articles.

To improve the transfer performance of the mold device and shorten the cooling time of the molding material, existing techniques may be used. For example, referring back to the above-described example of related art, the temperature-adjustment blocks are pressed against the mold in a direction that is perpendicular to the mold-clamping direction, but how much the mold is cooled down tends to vary in directions perpendicular to the mold-clamping direction. As a result of this, the molded article's compression is likely to exhibit variability in directions perpendicular to the mold-clamping direction. Note that the "mold-clamping direction" as used herein matches part of the directions in which the molds open and close.

Many molded articles are designed to have larger dimensions in directions perpendicular to the mold-clamping direction than in the mold-clamping direction. For example, lenses, connectors, container lids, etc. have larger dimensions in directions perpendicular to the mold-clamping direction than in the mold-clamping direction. Consequently, when the molded article is compressed, the compression shows variability in directions perpendicular to the mold-clamping direction, which then leads to reduced dimensional accuracy of the molded article.

An embodiment of the present disclosure therefore aims to provide a technique that makes it possible to prevent or substantially prevent uneven cooling of the mold device in directions that are perpendicular to the mold-clamping direction, and prevent or substantially prevent every molded article from being compressed unevenly in directions perpendicular to the mold-clamping direction.

Now, an embodiment of the present disclosure will be described with reference to the accompanying drawings. Note that the same or similar components in each drawing will be assigned the same or similar codes without redundant explanation.

(Injection Molding Machine)

Figure 1:
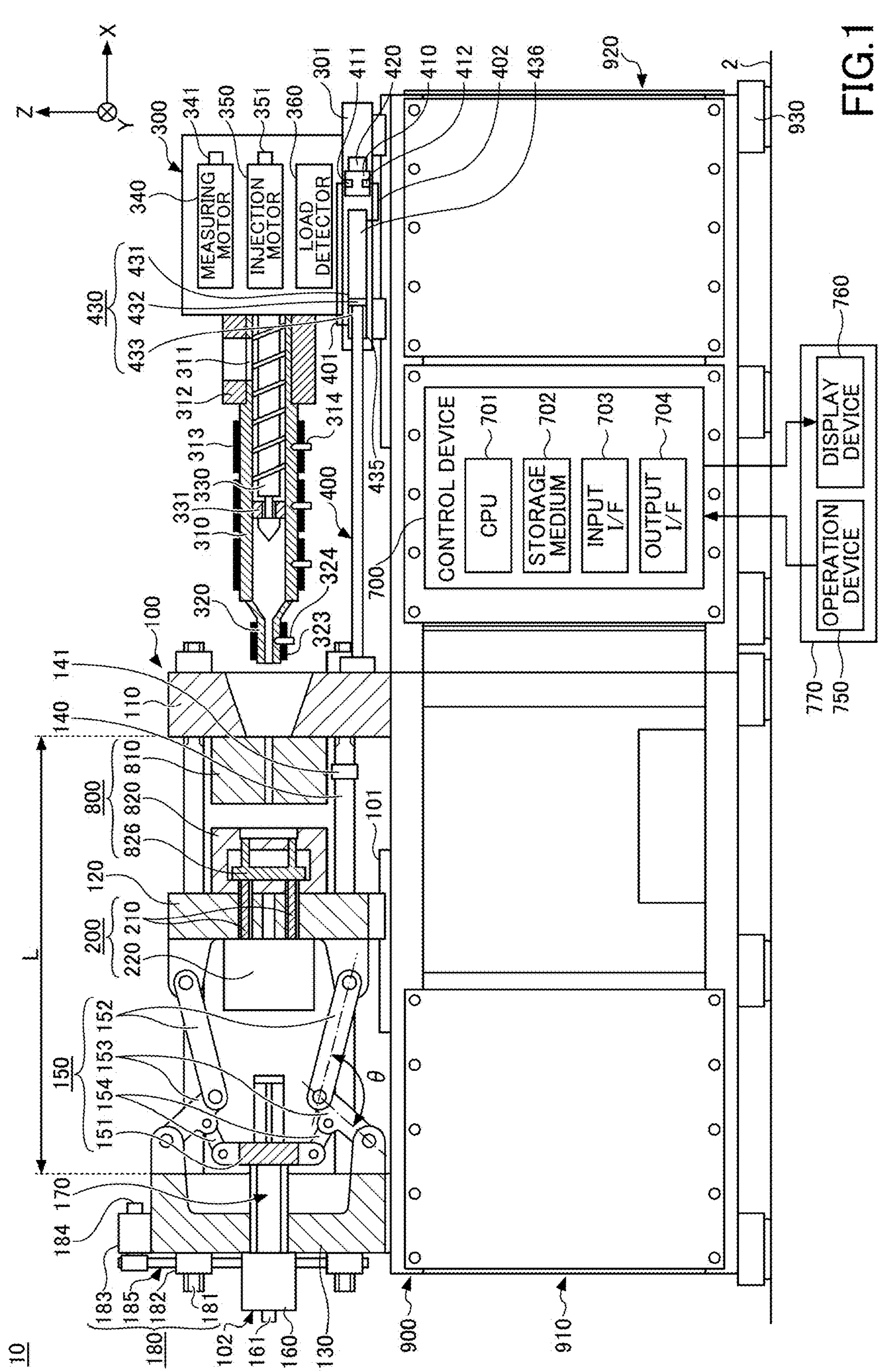
FIG. 1 is a diagram that shows a state in which the molds of an injection molding machine according to an embodiment of the present disclosure are completely open.
Figure 2:
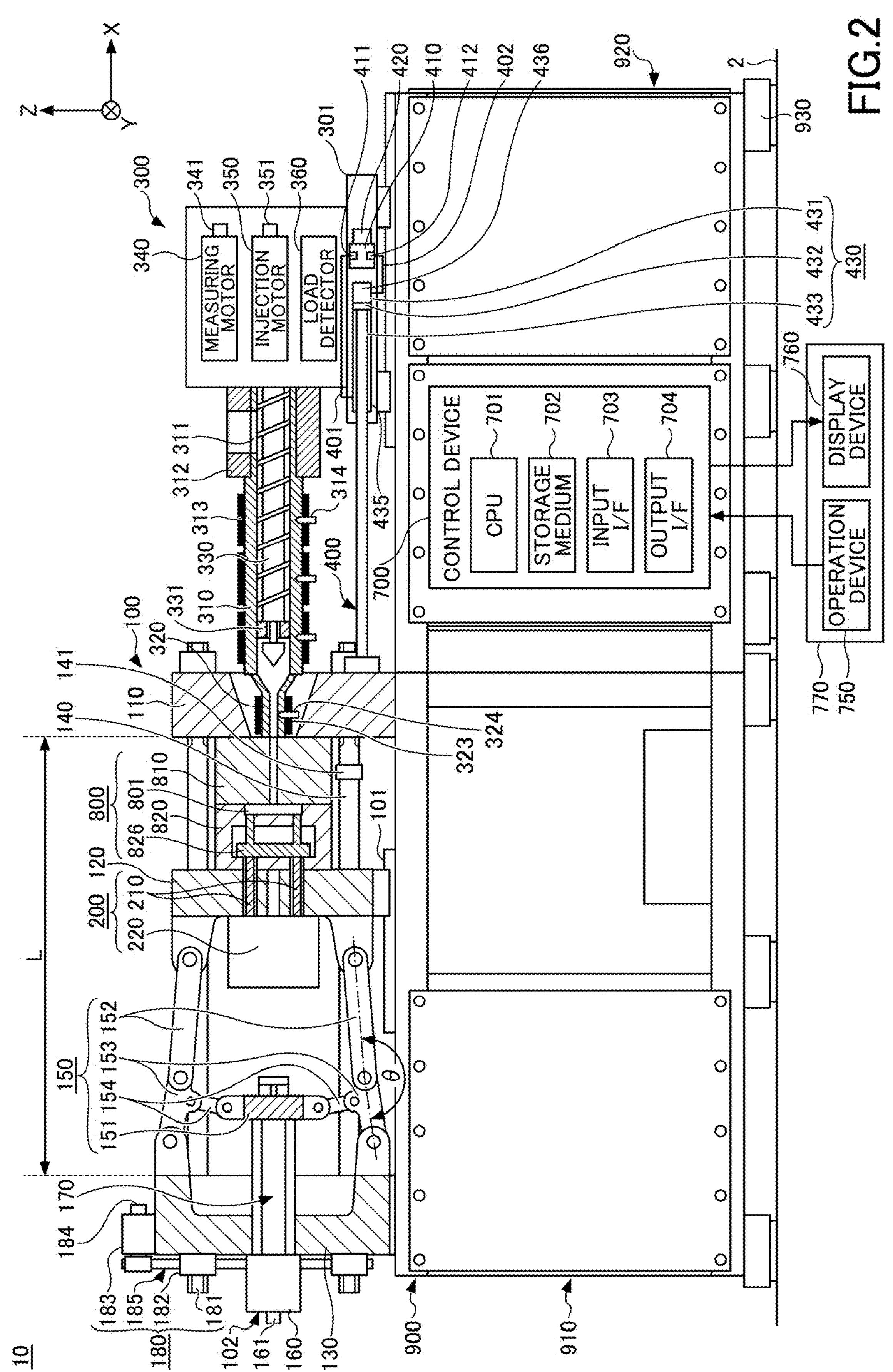
FIG. 2 is a diagram that shows a state in which the molds of an injection molding machine according to an embodiment of the present disclosure are clamped together.

FIG. 1 is a diagram that shows a state in which the molds of an injection molding machine according to an embodiment of the present disclosure are completely open. FIG. 2 is a diagram that shows a state in which the molds of an injection molding machine according to an embodiment of the present disclosure are clamped together. As used in the following description, the X-axis direction, the Y-axis direction, and the Z-axis direction are perpendicular to each other. The X-axis direction and the Y-axis direction extend horizontally, and the Z-axis direction extends vertically. In the event a mold clamping device 100 is a horizontal type, the molds open and close in positive and negative X-axis directions, and the width of an injection molding machine 10 spans in the Y-axis direction. The negative side in the Y-axis direction will be hereinafter referred to as an "operation side," and the positive side in the Y-axis direction will be hereinafter referred to as a "side opposite to the operation side."

As illustrated in FIG. 1 and FIG. 2, the injection molding machine 10 includes: a mold clamping device 100 that opens and closes a mold device 800; an ejector device 200 that ejects a molded article that is molded by the mold device 800; an injection device 300 that injects a molding material into the mold device 800; a moving device 400 that allows the injection device 300 to move forward and backward with respect to the mold device 800; a control device 700 that controls the components of the injection molding machine 10; and a frame 900 that supports the components of the injection molding machine 10. The frame 900 includes: a mold clamping device frame 910 that supports the mold clamping device 100; and an injection device frame 920 that supports the injection device 300. The mold clamping device frame 910 and the injection device frame 920 are both installed on a floor 2 via leveling adjusters 930. The control device 700 is placed in an inner space of the injection device frame 920. Now, each component of the injection molding machine 10 will be described below.

(Mold Clamping Device)

In the following description of the mold clamping device 100, the direction in which a movable platen 120 moves when closing the molds (for example, the positive X-axis direction) is defined as toward the front, and the direction in which the movable platen 120 moves when opening the molds (for example, the negative X-axis direction) is defined as toward the rear.

The mold device 800 includes a fixed mold 810 and a movable mold 820. The mold clamping device 100 closes the molds, increases the pressure, clamps the molds together, releases the pressure, opens the molds, etc., in the mold device 800.

The mold clamping device 100 is, for example, a horizontal type, so that the molds open and close in horizontal directions. The mold clamping device 100 includes: a fixed platen 110 to which the fixed mold 810 is attached; a movable platen 120 to which the movable mold 820 is attached; and a moving mechanism 102 that allows the movable platen 120 to move, with respect to the fixed platen 110, in directions in which the molds open and close (hereinafter also referred to as "mold opening/closing directions").

The fixed platen 110 is held fast to the mold clamping device frame 910. The fixed mold 810 is attached to the surface of the fixed platen 110 facing the movable platen 120.

The movable platen 120 is positioned such that it can move in the mold opening/closing directions with respect to the mold clamping device frame 910. A guide 101 for guiding the movable platen 120 is provided on the mold clamping device frame 910. The movable mold 820 is attached to the surface of the movable platen 120 facing the fixed platen 110.

The moving mechanism 102 moves the movable platen 120 forward and backward with respect to the fixed platen 110 to close the molds, increase the pressure, clamp the molds together, release the pressure, open the molds, etc., in the mold device 800. The moving mechanism 102 includes: a toggle support 130 positioned at a distance from the fixed platen 110; tie bars 140 that connect the fixed platen 110 and the toggle support 130; a toggle mechanism 150 that allows the movable platen 120 to move in the mold opening/closing directions with respect to the toggle support 130; a mold clamping motor 160 that runs the toggle mechanism 150; a motion conversion mechanism 170 that converts the rotational motion of the mold clamping motor 160 into linear motion; and a mold thickness adjustment mechanism 180 that adjusts the interval between the fixed platen 110 and the toggle support 130.

The toggle support 130 is positioned at a distance from the fixed platen 110 and placed on the mold clamping device frame 910 such that the toggle support 130 can move in the mold opening/closing directions. The toggle support 130 may also be positioned such that it can move along a guide that is provided on the mold clamping device frame 910. The guide 101 for the movable platen 120 may also serve as the guide for the toggle support 130.

In the present embodiment, although the fixed platen 110 is held fast to the mold clamping device frame 910 and the toggle support 130 is positioned such that it can move in the mold opening/closing directions with respect to the mold clamping device frame 910, it is also possible to employ a structure in which the toggle support 130 is held fast to the mold clamping device frame 910 and the fixed platen 110 is positioned such that it can move in the mold opening/closing directions with respect to the mold clamping device frame 910.

Each tie bar 140 connects the fixed platen 110 and the toggle support 130 with an interval L therebetween in the mold opening/closing directions. Multiple (for example, four) tie bars 140 may be used. Multiple tie bars 140 may be arranged in parallel in the mold opening/closing directions and extend in accordance with the mold clamping force. At least one tie bar 140 may be provided with a tie bar strain detector 141 for detecting the strain of the tie bar 140. The tie bar strain detector 141 sends signals representing the detection results obtained thereat to the control device 700. The detection results of the tie bar strain detector 141 are used, for example, to detect the mold clamping force.

In the present embodiment, the tie bar strain detector 141 is used as a mold clamping force detector for detecting the molds' clamping force, but the present disclosure is by no means limited to this. The mold clamping force detector is by no means limited to a strain gauge type, and may be a piezoelectric type, a capacitance type, a hydraulic type, an electromagnetic type, etc., and the position where the mold clamping force detector is attached need not be the tie bars 140 either.

The toggle mechanism 150 is positioned between the movable platen 120 and the toggle support 130, and allows the movable platen 120 to move in the mold opening/closing directions with respect to the toggle support 130. The toggle mechanism 150 has: a crosshead 151 that moves in the mold opening/closing directions; and a pair of link groups that bend and extend in conjunction with the movement of the crosshead 151. In each link group, a first link 152 and a second link 153 are connected using a pin or the like such that they can bend and extend. The first link 152 is attached to the movable platen 120 by a pin or the like such that the first link 152 can swing. The second link 153 is attached to the toggle support 130 by a pin or the like such that the second link 153 can swing. The second link 153 is attached to the crosshead 151 via a third link 154. When the crosshead 151 moves back and forth relative to the toggle support 130, the first links 152 and the second links 153 bend and extend, so that the movable platen 120 moves back and forth relative to the toggle support 130.

The structure of the toggle mechanism 150 is by no means limited to the ones shown in FIG. 1 and FIG. 2. For example, although the number of nodes in each link group is five in FIG. 1 and FIG. 2, it may be four. Furthermore, one end of each third link 154 may be connected to the node between the corresponding first link 152 and second link 153.

The mold clamping motor 160 is attached to the toggle support 130 and runs the toggle mechanism 150. The mold clamping motor 160 moves the crosshead 151 forward and backward with respect to the toggle support 130, so that the first links 152 and the second links 153 bend and extend and the movable platen 120 moves forward and backward with respect to the toggle support 130. Although the mold clamping motor 160 is directly connected to the motion conversion mechanism 170, it may be connected to the motion conversion mechanism 170 via a belt, a pulley, or the like.

The motion conversion mechanism 170 converts the rotational motion of the mold clamping motor 160 into linear motion of the crosshead 151. The motion conversion mechanism 170 includes screw shafts and screw nuts. The screw nuts are screwed into the screw shafts. Balls or rollers may be interposed between the screw shafts and the screw nuts.

The mold clamping device 100 performs a mold closing step, a pressure increasing step, a mold clamping step, a pressure releasing step, a mold opening step, etc., under the control of the control device 700.

In the mold closing step, the mold clamping motor 160 is driven to move the crosshead 151 forward, at a set moving speed, up to a position where the molds are completely closed (hereinafter "mold closing completion position"), thereby allowing the movable platen 120 to move forward and the movable mold 820 to contact the fixed mold 810. The position and the moving speed of the crosshead 151 are detected by using, for example, a mold clamping motor encoder 161. The mold clamping motor encoder 161 detects the rotation of the mold clamping motor 160 and sends a signal representing the detection result to the control device 700.

In the event a crosshead position detector for detecting the position of the crosshead 151 and a crosshead moving speed detector for detecting the moving speed of the crosshead 151 are to be provided, these need not be the mold clamping motor encoder 161, and general detectors may be used as well. Likewise, in the event a movable platen position detector for detecting the position of the movable platen 120 and a movable platen moving speed detector for detecting the moving speed of the movable platen 120 are to be provided, these need not be the mold clamping motor encoder 161 either, and general detectors may be used as well.

In the pressure increasing step, a mold clamping force is produced by driving the mold clamping motor 160 more and moving the crosshead 151 further forward, from the mold closing completion position to a mold clamping position.

In the mold clamping step, the mold clamping motor 160 is driven such that the position of the crosshead 151 is maintained at the mold clamping position. In the mold clamping step, the mold clamping force produced in the pressure increasing step is maintained. In the mold clamping step, a cavity space 801 is formed between the movable mold 820 and the fixed mold 810 (see FIG. 2), and the injection device 300 fills the cavity space 801 with a liquid molding material. The injected molding material solidifies, and thereupon a molded article is obtained.

There may be more than one cavity space 801. In the event multiple cavity spaces 801 are formed, a number of molded articles can be obtained at the same time. An insert component may be placed in a part of the cavity space 801, and the molding material may be injected and fill the rest of the cavity spaces 801. By doing so, a molded article in which the insert component and the molding material are joined together can be obtained.

In the pressure releasing step, the mold clamping motor 160 is driven to bring the crosshead 151 back from the mold clamping position to the position where the molds start opening (hereinafter also referred to as "mold opening start position"), thereby making the movable platen 120 retract and reducing the mold clamping force. The mold opening start position and the mold closing completion position may be the same position.

In the mold opening step, the movable platen 120 is retracted by driving the mold clamping motor 160, and the crosshead 151 is moved from the mold opening start position back to the mold opening completion position, at a set moving speed, so that the movable mold 820 is separated from the fixed mold 810. Subsequently, the ejector device 200 ejects the molded article from the movable mold 820.

The setting conditions for the mold closing step, the pressure increasing step, and the mold clamping step are set together as a group of setting conditions. For example, the moving speed and positions of the crosshead 151 (including the mold closing start position, the moving speed switching position, the mold closing completion position, and the mold clamping position) in the mold closing step and the pressure increasing step, and the mold clamping force are set together as a group of setting conditions. The mold closing start position, the moving speed switching position, the mold closing completion position, and the mold clamping position are arranged in this order, from the rear to the front, and represent, for example, the start point and end point of each period in which the moving speed is set. The moving speed is set per period. The number of moving speed switching positions may be one or more. It is equally possible not to set a moving speed switching position. Only one of the mold clamping position and the mold clamping force need be set.

The setting conditions for the pressure releasing step and the mold opening step are set likewise. For example, the moving speed and positions of the crosshead 151 (including the mold opening start position, the moving speed switching position, and the mold opening completion position) in the pressure releasing step and the mold opening step are set together as a group of setting conditions. The mold opening start position, the moving speed switching position, and the mold opening completion position are arranged in this order, from the front to the rear, and represent, for example, the start point and end point of each period in which the moving speed is set. The moving speed is set per period. The number of moving speed switching positions may be one or more. It is equally possible not to set a moving speed switching position. The mold opening start position and the mold closing completion position may be the same position. The mold opening completion position and the mold closing start position may be the same position.

Instead of setting the moving speed and positions of the crosshead 151, the moving speed and positions of the movable platen 120 may be set. Instead of setting the crosshead's positions (for example, the mold clamping position) or setting the movable platen's positions, the mold clamping force may be set.

The toggle mechanism 150 amplifies the driving force of the mold-clamping motor 160 and transmits it to the movable platen 120. The amplification factor is also referred to as "toggle factor." The toggle factor changes depending on the angle θ formed between the first link 152 and the second link 153 (hereinafter also referred to as "link angle θ"). The link angle θ is determined from the position of the crosshead 151. The toggle factor is maximized when the link angle θ is 180°.

In the event the thickness of the mold device 800 changes when, for example, the mold device 800 is replaced, the temperature of the mold device 800 changes, and so on, the molds' thickness is adjusted such that a predetermined mold clamping force is gained when the molds are clamped together. In adjusting the thickness of the molds, for example, the interval L between the fixed platen 110 and the toggle support 130 is adjusted such that the link angle θ of the toggle mechanism 150 becomes a predetermined angle when the movable mold 820 touches the fixed mold 810 (the event being also referred as "mold touch").

The mold clamping device 100 includes a mold thickness adjustment mechanism 180. The mold thickness adjustment mechanism 180 adjusts the thickness of the molds by adjusting the interval L between the fixed platen 110 and the toggle support 130. This mold thickness adjustment is performed, for example, at a timing between the end of one molding cycle and the beginning of the next molding cycle. The mold thickness adjustment mechanism 180 includes, for example: screw shafts 181 formed at a proximal end portion of each tie bar 140; screw nuts 182 held by the toggle support 130 such that each screw nut 182 can rotate but cannot move forward or backward; and a mold thickness adjustment motor 183 that rotates the screw nuts 182 that are screwed into the screw shafts 181.

The screw shafts 181 and the screw nuts 182 are provided per tie bar 140. The rotational driving force of the mold thickness adjustment motor 183 may be transmitted to a number of screw nuts 182 via a rotational driving force transmission part 185. Multiple screw nuts 182 can be rotated synchronously. It is also possible to make multiple screw nuts 182 rotate individually by laying respective transmission paths from the rotational driving force transmission part 185.

The rotational driving force transmission part 185 is constituted by gears, for example. In this case, a driven gear is provided in the outer periphery of each screw nut 182. A driving gear is attached to the output shaft of the mold thickness adjustment motor 183, and an intermediate gear that meshes with multiple driven gears and the driving gear is rotatably held at the center of the toggle support 130. The rotational driving force transmission part 185 may be constituted by belts, pulleys, or the like, instead of gears.

The operation of the mold thickness adjustment mechanism 180 is controlled by the control device 700. The control device 700 drives the mold thickness adjustment motor 183 to rotate the screw nuts 182. As a result of this, the position of the toggle support 130 with respect to the tie bars 140 is adjusted, and the interval L between the fixed platen 110 and the toggle support 130 is adjusted. Multiple mold thickness adjustment mechanisms may be combined and used.

The interval L is detected by using the mold thickness adjustment motor encoder 184. The mold thickness adjustment motor encoder 184 detects the amount of rotation and the direction of rotation of the mold thickness adjustment motor 183 and sends a signal representing the detection results to the control device 700. The detection results of the mold thickness adjustment motor encoder 184 are used to monitor and control the position of the toggle support 130, the interval L, and so forth. In the event a toggle support position detector for detecting the position of the toggle support 130 and an interval detector for detecting the interval L are to be provided, these need not be the mold thickness adjustment motor encoder 184, and general detectors may be used as well.

The mold clamping device 100 may include a mold temperature adjuster that controls the temperature of the mold device 800. The mold device 800 has inner flow paths for a temperature adjusting medium. The mold temperature adjuster adjusts the temperature of the mold device 800 by adjusting the temperature of the temperature adjusting medium supplied to the flow paths in the mold device 800.

The mold clamping device 100 of the present embodiment is a horizontal type, in which the molds open and close horizontally, but the mold clamping device 100 may also be a vertical type in which the molds open and close vertically.

The mold clamping device 100 of the present embodiment includes the mold clamping motor 160 as a drive part, but may include a hydraulic cylinder instead of the mold clamping motor 160. Furthermore, the mold clamping device 100 may use a linear motor to open and close the molds and an electromagnet to clamp the molds together.

(Ejector Device)

Similar to the above description of the mold clamping device 100, in the following description of the ejector device 200, the direction in which the movable platen 120 moves when closing the molds (for example, the positive X-axis direction) is defined as toward the front, and the direction in which the movable platen 120 moves when opening the molds (for example, the negative X-axis direction) is defined as toward the rear.

The ejector device 200 is attached to the movable platen 120 and moves forward and backward with the movable platen 120. The ejector device 200 includes: ejector rods 210 that eject the molded article from the mold device 800; and a drive mechanism 220 that moves the ejector rods 210 in directions in which the movable platen 120 moves (the positive and negative X-axis directions).

Each ejector rod 210 is positioned in a through-hole formed in the movable platen 120 such that the ejector rod 210 can move forward and backward. The distal end portion of each ejector rod 210 contacts an ejector plate 826 of the movable mold 820. The distal end portion of each ejector rod 210 may or may not be connected with the ejector plate 826.

The drive mechanism 220 includes, for example, an ejector motor and a motion conversion mechanism that converts the rotational motion of the ejector motor into linear motion of the ejector rods 210. The motion conversion mechanism include screw shafts and screw nuts. The screw nuts are screwed into the screw shafts. Balls or rollers may be interposed between the screw shafts and the screw nuts.

The ejector device 200 performs the ejection process under the control of the control device 700. In the ejection step, the ejector rods 210 are moved forward from the standby positions to the ejection positions at a set moving speed, allowing the ejector plate 826 to move forward and eject the molded article. Subsequently, the ejector motor is driven to retract the ejector rods 210 at a set moving speed, and the ejector plate 826 is moved backward to resume its original standby position.

The positions and moving speed of the ejector rods 210 are detected by using, for example, an ejector motor encoder. The ejector motor encoder detects the rotation of the ejector motor and sends a signal representing the detection result to the control device 700. In the event an ejector rod position detector for detecting the positions of the ejector rods 210 and an ejector rod moving speed detector for detecting the moving speed of the ejector rods 210 are to be provided, these need not be an ejector motor encoder, and general detectors may be used as well.

(Injection Device)

In the following description of the injection device 300, unlike the description of the mold clamping device 100 and the description of the ejector device 200 given above, the direction in which the screw 330 moves when the molding material is injected (for example, the negative X-axis direction) is defined as toward the front, and the direction in which the screw 330 moves when measurements are conducted (for example, the positive X-axis direction) is defined as toward the rear.

The injection device 300 is installed on a slide base 301. The slide base 301 is positioned such that it can move forward and backward with respect to an injection device frame 920. The injection device 300 is positioned such that it can move forward and backward with respect to the mold device 800. The injection device 300 touches the mold device 800 and fills the cavity space 801 inside the mold device 800 with the molding material. The injection device 300 includes, for example: a cylinder 310 that heats the molding material; a nozzle 320 provided at a distal end portion of the cylinder 310; a screw 330 positioned in the cylinder 310 such that the screw 330 can move forward and backward and rotate; a measurement motor 340 that rotates the screw 330; an injection motor 350 that moves the screw 330 forward and backward; and a load detector 360 that detects the load transmitted between the injection motor 350 and the screw 330.

The cylinder 310 heats the molding material supplied from a supply port 311 to the inside of the mold device 800. The molding material includes, for example, a resin. The molding material is formed in a pellet shape, for example, and supplied to the supply port 311 in a solid state. The supply port 311 is formed in a rear portion of the cylinder 310. A cooler 312, such as a water-cooled cylinder or the like, is provided in the outer periphery of a rear portion of the cylinder 310. Ahead of the cooler 312, first heaters 313 such as band heaters or the like, and first temperature detectors 314, are provided in the outer periphery of the cylinder 310.

The cylinder 310 is divided into a number of "zones" in the axial direction of the cylinder 310 (for example, the X-axis direction). The first heaters 313 and the first temperature detectors 314 are provided per zone. Each zone is adjusted to a set temperature, and the control device 700 controls the first heater 313 such that the temperature detected by the first temperature detector 314 and the set temperature for the zone match.

The nozzle 320 is provided at a distal end portion of the cylinder 310 and is pressed against the mold device 800. Second heaters 323 and a second temperature detector 324 are provided in the outer periphery of the nozzle 320. The control device 700 controls the second heaters 323 such that the temperature detected by the nozzle 320 and the set temperature match.

The screw 330 is positioned inside the cylinder 310 such that the screw 330 can rotate and move forward and backward. When the screw 330 rotates, the molding material is delivered forward along the spiral thread of the screw 330. While the molding material is delivered forward, the heat from the cylinder 310 melts the molding material gradually. The liquid molding material is pushed toward the front of the screw 330. As the molding material accumulates in a front portion of the cylinder 310, the screw 330 is retracted. Subsequently, the screw 330 is moved forward, and the liquid molding material accumulated in front of the screw 330 is injected from the nozzle 320 and fills the inside of the mold device 800.

A backflow prevention ring 331 is attached to a front portion of the screw 330 such that the backflow prevention ring 331 can move forward and backward. The backflow prevention ring 331 serves as a backflow prevention valve that prevents backflow of the molding material from the front side to the rear side of the screw 330 when the screw 330 is pushed forward.

When the screw 330 moves forward, the backflow prevention ring 331 is pushed backward by the pressure of the molding material accumulated in front of the screw 330, and is retracted, relative to the screw 330, to a block position where the backflow prevention ring 331 blocks the flow path of the molding material (see FIG. 2). This can prevent the molding material accumulated in front of the screw 330 from flowing backward.

Meanwhile, when the screw 330 rotates, the backflow prevention ring 331 is pushed forward by the pressure of the molding material that is delivered forward along the spiral thread of the screw 330. The backflow prevention ring 331 moves forward, relative to the screw 330, up to an open position (see FIG. 1) where the flow path of the molding material is opened. Thus, the molding material is delivered to the front of the screw 330.

The backflow prevention ring 331 may be either a co-rotation type that rotates with the screw 330 or a non-co-rotation type that does not rotate with the screw 330.

The injection device 300 may additionally include a drive source for moving the backflow prevention ring 331 forward and backward between the open position and the block position with respect to the screw 330.

The measurement motor 340 rotates the screw 330. The drive source for rotating the screw 330 is by no means limited to the measurement motor 340, and may be, for example, a hydraulic pump.

The injection motor 350 moves the screw 330 forward and backward. Between the injection motor 350 and the screw 330, a motion conversion mechanism or the like is provided to convert the rotational motion of the injection motor 350 into linear motion of the screw 330. The motion conversion mechanism includes, for example, screw shafts and screw nuts that mesh with the screw shafts. Balls, rollers, or the like may be provided between the screw shafts and the screw nuts. The drive source for allowing the screw 330 to move forward and backward is by no means limited to the injection motor 350, and, for example, a hydraulic cylinder or the like may be used.

The load detector 360 detects the load that is transmitted between the injection motor 350 and the screw 330. The detected load is converted into a pressure by the control device 700. The load detector 360 is provided in a load transmission path between the injection motor 350 and the screw 330, and detects the load that acts on the load detector 360.

The load detector 360 sends a signal representing the detected load to the control device 700. The load that is detected by the load detector 360 is converted into a pressure that acts between the screw 330 and the molding material, and used to control or monitor, for example, the pressure that the screw 330 receives from the molding material, the back pressure that acts on the screw 330, the pressure that acts on the molding material from the screw 330, etc.

In the event a pressure detector for detecting the pressure of the molding material is to be provided, it need not be the load detector 360, and a general detector may be used. For example, a nozzle pressure sensor or a mold internal pressure sensor may be used. A nozzle pressure sensor may be provided in the nozzle 320. A mold internal pressure sensor may be provided inside the mold device 800.

The injection device 300 performs a measurement step, a filling step, a pressure-maintaining step, etc., under the control of the control device 700. The filling step and the pressure-maintaining step may be collectively referred to as an "injection step."

In the measurement step, the measurement motor 340 is driven to rotate the screw 330 at a set rotation speed, and the molding material is delivered forward along the spiral thread of the screw 330. While this is in progress, the molding material is melted gradually. As the liquid molding material is delivered to the front of the screw 330 and accumulated in a front portion of the cylinder 310, the screw 330 is retracted. The rotation speed of the screw 330 is detected by using, for example, the measurement motor encoder 341. The measurement motor encoder 341 detects the rotation of the measurement motor 340 and sends a signal representing the detection result to the control device 700. In the event a screw rotational speed detector for detecting the rotational speed of the screw 330 is to be provided, it need not be the measurement motor encoder 341, and a general detector may be used as well.

In the measurement step, in order to prevent or substantially prevent the screw 330 from jerking backward, the injection motor 350 may be driven to apply a predetermined back pressure to the screw 330. The back pressure to be applied to the screw 330 is detected by using, for example, the load detector 360. When the screw 330 moves backward to a measurement completion position and a predetermined amount of molding material is accumulated in front of the screw 330, the measurement step ends.

The positions and rotation speed of the screw 330 in the measurement step are set together as a group of setting conditions. For example, a measurement start position, a rotational speed switching position, and a measurement completion position are set. These positions are arranged in this order, from the front to the rear, and represent, for example, the start point and the end point of each period in which the rotation speed is set. The rotation speed is set per period. The number of rotation speed switching positions may be one or more. It is equally possible not to set a rotation speed switching position. Furthermore, a back pressure is set in each period.

In the filling step, the injection motor 350 is driven to move the screw 330 forward at a set moving speed, and the liquid molding material accumulated in front of the screw 330 is injected into the cavity space 801 in the mold device 800. The position and the moving speed of the screw 330 are detected by using, for example, an injection motor encoder 351. The injection motor encoder 351 detects the rotation of the injection motor 350 and sends a signal representing the detection result to the control device 700. When the screw 330 reaches a set position, the filling step switches to the pressure-maintaining step (the switch known as "V/P switchover"). The position where the V/P switchover takes place is also referred to as a "V/P switchover position." The set moving speed of the screw 330 may be changed according to the position of the screw 330, time, and so forth.

The positions and moving speed of the screw 330 in the filling step are set together as a group of setting conditions. For example, a filling start position (also referred to as an "injection start position"), a moving speed switching position, a V/P switchover position, and so forth may be set. These positions are arranged in this order, from the rear to the front, and represent, for example, the start point and the end point of each period in which the rotation speed is set. The moving speed is set per period. The number of moving speed switching positions may be one or more. It is equally possible not to set a moving speed switching position.

An upper limit value for the pressure of the screw 330 is set in each period in which the moving speed of the screw 330 is set. The pressure of the screw 330 is detected by the load detector 360. If the pressure of the screw 330 is equal to or lower than a set pressure, the screw 330 moves forward at the set moving speed. On the other hand, if the pressure of the screw 330 is greater than the set pressure, then, for the purpose of protecting the molds, the screw 330 moves forward at a lower moving speed than the set moving speed, so that the pressure of the screw 330 becomes equal to or lower than the set pressure.

Note that, after the screw 330 reaches the V/P switchover position in the filling step, the screw 330 may be temporarily stopped at the V/P switchover position, and then a V/P switchover may take place. Instead of stopping the screw 330, it is also possible to move the screw 330 forward or backward at a very low speed shortly before the V/P switchover takes place. In the event a screw position detector for detecting the position of the screw 330 and a screw moving speed detector for detecting the moving speed of the screw 330 are to be provided, these need not be the injection motor encoder 351, and general detectors may be used as well.

In the pressure-maintaining step, the injection motor 350 is driven to push the screw 330 forward, the pressure of the molding material at a distal end portion of the screw 330 (hereinafter also referred to as "maintenance pressure") is maintained at a set pressure, and the molding material that remains in the cylinder 310 is pushed toward the mold device 800. The molding material that is insufficient due to the cooling and contraction occurring in the mold device 800 can be thus replenished. The maintenance pressure is detected by using, for example, the load detector 360. The set value of the maintenance pressure may be changed depending on, for example, the duration of time having elapsed from the start of the pressure-maintaining step. Multiple maintenance pressures and multiple durations of time for maintaining the maintenance pressure in the pressure-maintaining step may be set, and may be set together as a group of setting conditions.

In the pressure-maintaining step, the molding material in the cavity space 801 in the mold device 800 is cooled down slowly. When the pressure-maintaining step ends, the inlet of the cavity space 801 is covered by the solidified molding material. This state is referred to as "gate seal," and prevents a backflow of the molding material from the cavity space 801. After the pressure-maintaining step ends, the cooling step begins. In the cooling step, the molding material in the cavity space 801 is solidified. In order to shorten the time of the molding cycle, the measurement step may be performed while the cooling step is still in progress.

The injection device 300 of the present embodiment is an in-line screw type but may be a pre-plasticization type, for example. A pre-plasticization injection device supplies the molding material melted in a plasticization cylinder to an injection cylinder, and, through the injection cylinder, injects the molding material into the mold device. In the plasticization cylinder, a screw is provided such that it can rotate but cannot move forward or backward, or a screw is provided such that it can rotate and move forward and backward. Inside the injection cylinder, a plunger is positioned such that it can move forward and backward.

The injection device 300 of the present embodiment is a horizontal type in which the axial direction of the cylinder 310 is horizontal, but may be a vertical type in which the axial direction of the cylinder 310 is vertical. The mold clamping device to be combined with a vertical injection device 300 may be either a vertical type or a horizontal type. Similarly, the mold clamping device to be combined with a horizontal injection device 300 may be either a horizontal type or a vertical type.

(Moving Device)

As in the description of the injection device 300 given above, in the following description of the moving device 400, the direction in which the screw 330 moves when the molding material is injected (for example, the negative X-axis direction) is defined as toward the front, and the direction in which the screw 330 moves when measurements are conducted (for example, the positive X-axis direction) is defined as toward the rear.

The moving device 400 retracts the injection device 300 with respect to the mold device 800. The moving device 400 presses the nozzle 320 against the mold device 800 to produce a nozzle touch pressure. The moving device 400 includes a hydraulic pump 410, a motor 420 that serves as a drive source, a hydraulic cylinder 430 that serves as a hydraulic actuator, and so forth.

The hydraulic pump 410 has a first port 411 and a second port 412. The hydraulic pump 410 is a pump that can rotate in both directions, and produces a hydraulic pressure by switching the rotation direction of the motor 420 and sucking in the working liquid (for example, oil) from one of the first port 411 and the second port 412 and discharging it from the other port. The hydraulic pump 410 can also suck in the working liquid from a tank and discharge it from one of the first port 411 and the second port 412.

The motor 420 runs the hydraulic pump 410. The motor 420 drives the hydraulic pump 410 in a rotating direction, with a rotating torque, according to a control signal from the control device 700. The motor 420 may be an electric motor or an electric servo motor.

The hydraulic cylinder 430 includes a cylinder main body 431, a piston 432, and a piston rod 433. The cylinder main body 431 is held fast to the injection device 300. The piston 432 divides the inside of the cylinder main body 431 into a front chamber 435 and a rear chamber 436, which serve as a first chamber and a second chamber, respectively. The piston rod 433 is held fast to the fixed platen 110.

The front chamber 435 of the hydraulic cylinder 430 is connected to the first port 411 of the hydraulic pump 410 via a first flow path 401. The working liquid discharged from the first port 411 is supplied to the front chamber 435 via the first flow path 401, so that the injection device 300 is pushed forward. As the injection device 300 moves forward, the nozzle 320 is pressed against the fixed mold 810. Given the pressure of the working liquid supplied from the hydraulic pump 410, the front chamber 435 functions as a pressure chamber that produces a nozzle touch pressure for the nozzle 320.

The rear chamber 436 of the hydraulic cylinder 430 is connected to the second port 412 of the hydraulic pump 410 via a second flow path 402. The working liquid discharged from the second port 412 is supplied to the rear chamber 436 of the hydraulic cylinder 430 via the second flow path 402, so that the injection device 300 is pushed backward. As the injection device 300 moves backward, the nozzle 320 is separated from the fixed mold 810.

According to the present embodiment, the moving device 400 includes the hydraulic cylinder 430, but the present disclosure is by no means limited to this example. For example, instead of using the hydraulic cylinder 430, an electric motor and a motion conversion mechanism that converts the rotational motion of the electric motor into linear motion of the injection device 300 may be used.

(Control Device)

The control device 700 is constituted by, for example, a computer, and includes a central processing unit (CPU) 701, a storage medium 702 such as a memory, an input interface 703, and an output interface 704, as illustrated in FIG. 1 and FIG. 2. The control device 700 performs various controls by causing the CPU 701 to execute programs stored in the storage medium 702. The control device 700 receives signals from external devices through the input interface 703, and transmits signals to the external devices through the output interface 704.

The control device 700 repeats performing, for example, a measurement step, a mold closing step, a pressure increasing step, a mold clamping step, a filling step, a pressure-maintaining step, a cooling step, a pressure releasing step, a mold opening step, an ejection step, etc., thereby manufacturing molded articles on a continuous basis (see FIG. 4). A series of operations for producing a molded article (for example, the operation from the start of the measurement step to the start of the next measurement step) is also referred to as a "shot" or a "molding cycle." The time required for one shot is referred to as "molding cycle time" or "cycle time."

One molding cycle includes, for example, a measurement step, a mold closing step, a pressure increasing step, a mold clamping step, a filling step, a pressure-maintaining step, a cooling step, a pressure releasing step, a mold opening step, and an ejection step, in this order. This order is the order in which each step begins. The filling step, the pressure-maintaining step, and the cooling step are performed during the mold clamping step. The beginning of the mold clamping step and the beginning of the filling step may match. The end of the pressure releasing step matches the beginning of the mold opening step.

In order to shorten the molding cycle time, multiple steps may be performed at the same time. For example, the measurement step may be performed while the cooling step of the previous molding cycle is still in progress, or may be performed during the mold clamping step. In this case, the mold closing step may be performed at the beginning of the molding cycle. The filling step may be started during the mold closing step. The ejection step may be started during the mold opening step. In the event an opening/closing valve for opening and closing the flow path of the nozzle 320 is provided, the mold opening step may be started during the measurement step. This is because, even if the mold opening step is started while the measurement step is still in progress, the molding material does not leak from the nozzle 320 as long as the flow path of the nozzle 320 is closed by the opening/closing valve.

One molding cycle may include steps other than the measurement step, the mold closing step, the pressure increasing step, the mold clamping step, the filling step, the pressure-maintaining step, the cooling step, the pressure releasing step, the mold opening step, and the ejection step.

For example, after the pressure-maintaining step ends, before the measurement step is started, a pre-measurement suck-back step of bringing the screw 330 back to a predetermined measurement start position may be performed. This reduces the pressure of the molding material accumulated in front of the screw 330 before the measurement step is started, thereby preventing the screw 330 from jerking backward when the measurement step begins.

After the measurement step ends, before the filling step is started, a post-measurement suck-back step of bringing the screw 330 back to a predetermined filling start position (also referred to as "injection start position") may be performed. This can reduce the pressure of the molding material accumulated in front of the screw 330 before the filling step is started, and prevent a leakage of the molding material from the nozzle 320 before the filling step is started.

The control device 700 is connected with an operation device 750, which receives operational inputs from the user, and with a display device 760, on which a screen is displayed. The operation device 750 and the display device 760 may be constituted by, for example, a touch panel 770, and may be integrated together. The touch panel 770, which serves as the display device 760, displays a screen under the control of the control device 700. For example, information such as the settings of the injection molding machine 10 and the current state of the injection molding machine 10 may be displayed on the screen of the touch panel 770. On the screen of the touch panel 770, an operation part, such as buttons or an input field for entering operational inputs from the user, may be displayed. The touch panel 770, which serves as the operation device 750, detects an operational input from the user on the screen, and outputs a signal corresponding to the operational input to the control device 700. Thus, for example, the user can perform setting (including inputting setting values) for the injection molding machine 10 by operating the operation part provided on the screen while checking information displayed on the screen. The user operates the operation part on the screen, and the operation of the injection molding machine 10 is thus controlled according to the operations that the user performs on the operation part. The operation of the injection molding machine 10 may refer to, for example, the operation (including stopping) of the mold clamping device 100, the ejector device 200, the injection device 300, the moving device 400, and so forth. The operation of the injection molding machine 10 may also include switching of the screen that is displayed on the touch panel 770 serving as the display device 760.

Although the operation device 750 and the display device 760 of the present embodiment have been described as being integrated together as the touch panel 770, they may be provided separately as well. Also, multiple operation devices 750 may be provided. The operation device 750 and the display device 760 are positioned on the operation side (the negative Y-axis direction) of the mold clamping device 100 (to be more specific, the fixed platen 110).

(Mold Device)

Next, the mold device 800 according to an embodiment of the present disclosure will be described with reference to FIG. 3. The mold device 800 includes a fixed mold 810 and a movable mold 820. The fixed mold 810 is attached to a fixed platen 110 of the injection molding machine 10. The movable mold 820 is attached to a movable platen 120 of the injection molding machine 10. The mold device 800 forms a cavity space 801 between the fixed mold 810 and the movable mold 820 when the molds are clamped together. The cavity space 801 is a space to be filled with a molding material that is pre-heated in the cylinder 310 of the injection molding machine 10. The mold device 800 and the injection molding machine 10 constitute an injection molding system.

The fixed mold 810 includes, for example, a first mold piece 811, a first cooling part 812, and a first support part 813. The first mold piece 811 contacts the movable mold 820 when the molds are clamped together, and forms part of a wall surface of the cavity space 801. The first mold piece 811 is heated by the heat of the molding material filling the cavity space 801. The temperature of the first cooling part 812 is adjusted to a lower temperature than the temperature of the first mold piece 811 as of when the molding material was injected. The first support part 813 supports one of the first cooling part 812 and the first mold piece 811 such that the one that is supported can move relative to the other one. The first support part 813 functions as a guide. The first cooling part 812 and the first mold piece 811 can move relative to each other, between positions where they are spaced apart and positions where they are in contact with each other, in both directions in which the molds open and close (for example, the negative and positive X-axis directions).

The first mold piece 811 is held fast to the fixed platen 110. The first support part 813 supports the first cooling part 812 such that the first cooling part 812 can move relative to the fixed platen 110. The first cooling part 812 is positioned in the space between the first mold piece 811 and the fixed platen 110. Note that, although not illustrated, the first cooling part 812 may be held fast to the fixed platen 110. In that case, the first support part 813 supports the first mold piece 811 such that the first mold piece 811 can move relative to the fixed platen 110. The first cooling part 812 and the first mold piece 811 have only to be able to move relative to each other in both directions in which the molds open and close.

Both the first mold piece 811 and the first cooling part 812 may be shaped like a plate that is perpendicular to the directions in which the molds open and close. Viewing from the directions in which the molds open and close, it is preferable if the first cooling part 812 has a size equal to or larger than that of the first mold piece 811, in order to cool down the entirety of the first mold piece 811. The first support part 813 may be shaped like a rod that is parallel to the directions in which the molds open and close. The first support part 813 is inserted in a through-hole 812*a* that penetrates the first cooling part 812 in mold opening/closing directions. Multiple first support parts 813 may be provided. The first support part 813 is held fast to the fixed platen 110, and the first cooling part 812 moves along the first support part 813. The first support part 813 is compressed in the direction in which the molds close when the molds are clamped together, and transmits the mold-clamping force. Multiple first support parts 813 may be provided such that the mold-clamping force is applied evenly to the entire first mold piece 811. The first support parts 813 are provided, for example, respectively at each of the four corners of the first mold piece 811.

Figures 3A, 3B, 3C:
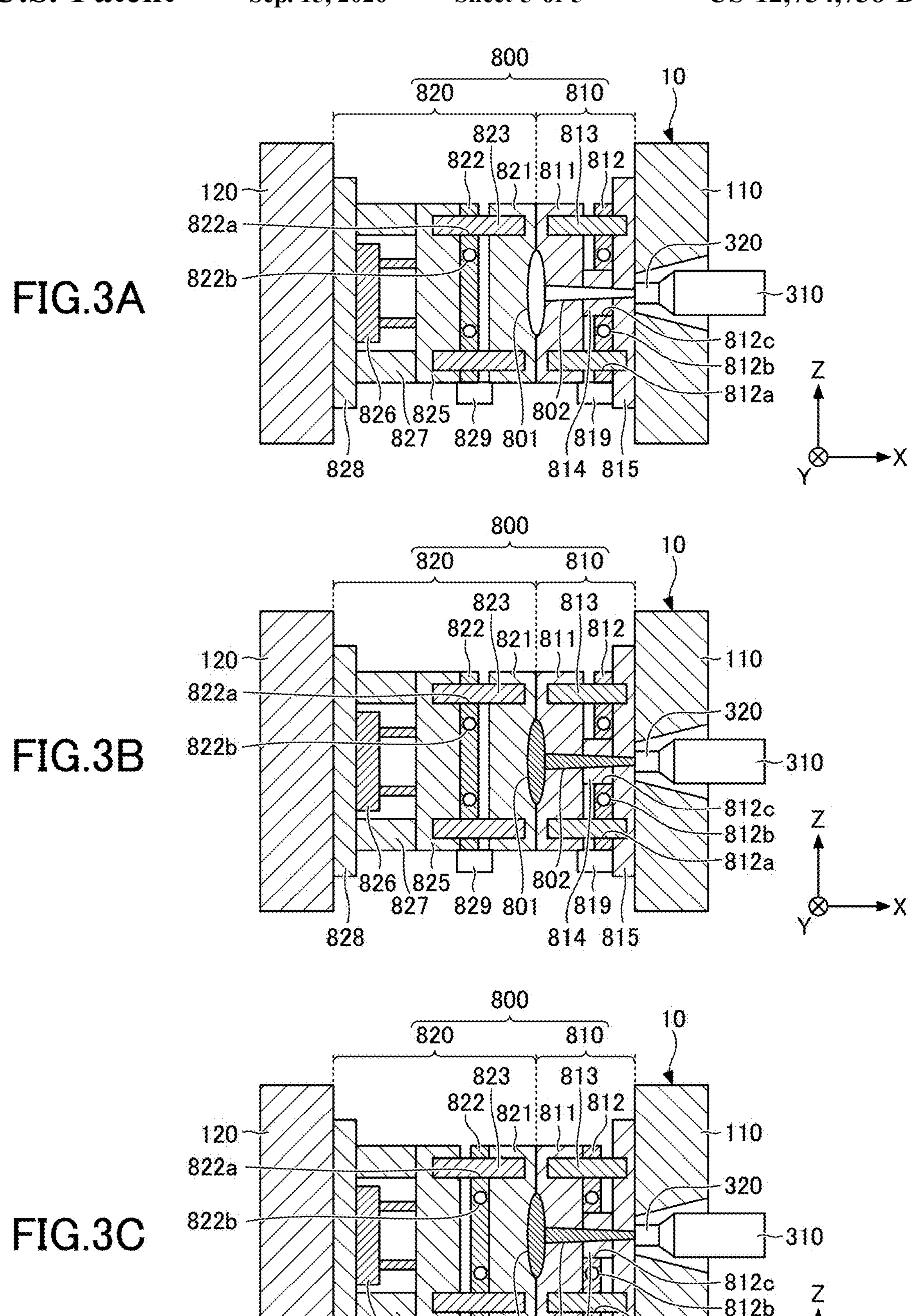
FIG. 3A is a cross-sectional view that shows a state in which filling of a mold device according to an embodiment of the present disclosure begins.
FIG. 3B is a cross-sectional view that shows a state in which filling of a mold device according to an embodiment of the present disclosure ends.
FIG. 3C is a cross-sectional view that shows a state in which a mold device according to an embodiment of the present disclosure is cooled down.

As shown in FIG. 3A and FIG. 3B, the first cooling part 812 and the first mold piece 811 may be parted when the molding material is injected. That is, in the filling step, the first cooling part 812 and the first mold piece 811 may be separated. A space is then formed between the first cooling part 812 and the first mold piece 811, which prevents or substantially prevents the heat from transmitting. Compared to when the first cooling part 812 and the first mold piece 811 are in contact with each other, the temperature of the first mold piece 811 is high, and the temperature of the wall surface of the cavity space 801 is high. As a result of this, the molding material has excellent fluidity when it is injected, so that the shape and dimensions of the cavity space 801 are easily transferred to the molded article. In other words, the mold device 800 achieves excellent transfer performance. It is therefore not necessary to heat the first mold piece 811 with a heating device in order to improve the transfer performance of the mold device 800 when injecting the molding material. However, the first mold piece 811 may be heated with a heating device when the molding material is injected. In either case, the temperature of the first mold piece 811 is higher and the temperature of the wall surface of the cavity space 801 is higher than when the first cooling part 812 and the first mold piece 811 are in contact with each other.

It is preferable if the first cooling part 812 and the first mold piece 811 are separated from each other at least from the beginning to the end of the filling step. It is more preferable if the first cooling part 812 and the first mold piece 811 are separated from each other at least during part of (preferably throughout) the pressure-maintaining step following the filling step. If the temperature of the first mold piece 811 is high during the pressure-maintaining step, it is easier to replenish the molding material that is insufficient due to the cooling and contraction occurring in the cavity space 801.

As shown in FIG. 3C, the first cooling part 812 and the first mold piece 811 may contact each other while the molding material cools down. That is, the first cooling part 812 and the first mold piece 811 may contact each other during the cooling step. The first cooling part 812 removes heat from the first mold piece 811 by contacting the first mold piece 811. As a result of this, the first mold piece 811 can be cooled down; the cooling time it takes for the molding material to solidify until it can be removed from the mold device 800 can be shortened. In particular, when the molded article is a thick thing such as a lens, the cooling time may be shortened significantly.

For example, when the pressure-maintaining step switches to the cooling step, the first cooling part 812 and the first mold piece 811 are moved relative to each other, from positions where they are separated from each other to positions where they are in contact with each other. Note that the first cooling part 812 and the first mold piece 811 may come into contact with each other while the cooling step is still in progress. Even if the first cooling part 812 and the first mold piece 811 come into contact with each other halfway through the cooling step, it is still possible to shorten the cooling time.

Many molded articles are designed to have larger dimensions in directions perpendicular to the mold-clamping direction than in the mold-clamping direction. For example, taking lenses, connectors, container lids, etc. as examples, these articles' dimensions in directions perpendicular to the mold-clamping direction are larger than their dimensions in the mold-clamping direction. This is because the cavity space 801 is formed where the mold device 800 is divided (that is, where the fixed mold 810 and the movable mold 820 meet). In other words, the cavity space 801 expands in directions perpendicular to the mold-clamping direction.

As described above, for many molded articles, their dimensions in directions perpendicular to the mold-clamping direction are larger than their dimensions in the mold-clamping direction. The present disclosure therefore focuses on the importance of preventing or substantially preventing the mold device 800 from cooling down unevenly in directions perpendicular to the mold-clamping direction in improving the dimensional accuracy of the molded article. Doing so leads to reduced variability in the molded article's contraction and reduced distortion of the molded article. In other words, the shape and dimensions of the cavity space 801 of the mold device 800 can be transferred to the molded article accurately.

In this embodiment, the first mold piece 811 and the first cooling part 812 are moved relative to each other in mold opening/closing directions. Unlike when the first cooling part 812 is moved in directions perpendicular to the directions in which the molds open and close as in related art, the present embodiment makes it possible to prevent or substantially prevent the first mold piece 811 from cooling down unevenly in directions perpendicular to the directions in which the molds open and close (to be more specific, in the mold-clamping direction). Doing so leads to reduced variability in the molded article's contraction and reduced distortion of the molded article, so that the accuracy of transfer from the first mold piece 811 to the molded article improves.

The first cooling part 812 has inner flow paths 812*b* through which the coolant flows. The coolant is adjusted to a set temperature in advance by a temperature adjustment device (not shown). The temperature adjustment device and the mold device 800 are connected by outbound piping and return piping. The coolant is supplied to the flow paths 812*b* via the outbound piping. After flowing through the flow paths 812*b*, the coolant returns to the temperature adjustment device via the return piping. The set temperature of the temperature adjustment device is set lower than the temperature of the first mold piece 811 as of when the molding material is injected. The coolant is, for example, water or oil.

In order to prevent or substantially prevent the first mold piece 811 from cooling down unevenly in directions perpendicular to the mold-clamping direction, it is preferable to lay out the flow paths 812*b* so as to surround the center part of the first mold piece 811 when viewed from the mold-clamping direction. A sprue 802 is provided such that a part of it penetrates the center part of the first mold piece 811. The sprue 802 is a flow path in which the molding material flows from the nozzle 320 of the injection molding machine 10 to the point where the mold device 800 is divided.

In order to prevent or substantially prevent the first mold piece 811 from cooling down unevenly in directions perpendicular to the mold-clamping direction, it is preferable to lay out the flow paths 812*b* so as to sandwich the center part of the first mold piece 811 in the Z-axis direction when viewed from the mold-clamping direction. In addition, in order to prevent or substantially prevent the first mold piece 811 from cooling down unevenly in directions perpendicular to the mold-clamping direction, it is preferable to lay out the flow paths 812*b* so as to sandwich the center part of the first mold piece 811 in the Y-axis direction when viewed from the mold-clamping direction.

The fixed mold 810 may have a first cylindrical part 814. A part of the sprue 802 penetrates the first cylindrical part 814. The first cylindrical part 814 is provided at the center of the surface of the first mold piece 811 opposite the movable mold 820. The first cylindrical part 814 is inserted in a through-hole 812*c* that penetrates the first cooling part 812 in the mold opening/closing directions. The first cooling part 812 moves along the first cylindrical part 814. The first cylindrical part 814 may function as a guide for the first cooling part 812. Also, the first cylindrical part 814 may be compressed in the mold opening/closing directions when the molds are clamped together, and transmit the mold-clamping force.

The fixed mold 810 may have a first back-surface part 815. The first back-surface part 815 is provided on the opposite side of the movable mold 820 with respect to the first mold piece 811. The first back-surface part 815 may be shaped like a plate that is perpendicular to the mold opening/closing directions. The first back-surface part 815 and the first mold piece 811 are positioned at an interval in the mold opening/closing directions. The first cooling part 812 is provided in the space between the first back-surface part 815 and the first mold piece 811 such that the first cooling part 812 can move in both of the mold opening/closing directions. Also, the first support part 813 and the first cylindrical part 814 are provided in the space between the first back-surface part 815 and the first mold piece 811. The first back-surface part 815 is attached to the fixed platen 110.

The fixed mold 810 may have a first drive part 819. The first drive part 819 moves the first cooling part 812 and the first mold piece 811 relative to each other. The first drive part 819 may be, for example, an air cylinder, a hydraulic cylinder, or an electric motor. Note that the first drive part 819 need not be a part of the fixed mold 810 and may be a part of the injection molding machine 10 instead. Also, for the first drive part 819, it is possible to use an existing device provided in the injection molding machine 10, such as the mold-clamping motor 160 of the mold-clamping device 100 or the drive mechanism 220 of the ejector device 200 shown in FIG. 1 and FIG. 2.

Note that, although the first cooling part 812 and the first support part 813 are provided in the fixed mold 810 in this embodiment, they may be provided in the injection molding machine 10 instead. Furthermore, the first cooling part 812 and the first support part 813 may be provided between the fixed mold 810 and the fixed platen 110. The first cooling part 812 and the first mold piece 811 have only to be able to move relative to each other in both of the mold opening/closing directions, between positions where they are spaced apart and positions where they are in contact with each other. The first mold piece 811 is provided in the fixed mold 810.

The movable mold 820 has, for example, a second mold piece 821, a second cooling part 822, and a second support part 823. The second mold piece 821 contacts the fixed mold 810 when the molds are clamped together, and forms a part of the wall surface of the cavity space 801. The second mold piece 821 is heated by the heat of the molding material filling the cavity space 801. The temperature of the second cooling part 822 is adjusted to a lower temperature than the temperature of the second mold piece 821 as of when the molding material is injected. The second support part 823 supports one of the second cooling part 822 and the second mold piece 821 such that the one that is selected can move relative to the other one. The second support part 823 functions as a guide. The second cooling part 822 and the second mold piece 821 can move relative to each other between positions where they are spaced apart and positions where they are in contact with each other, in both of the mold opening/closing directions (for example, the negative and positive X-axis directions).

The second mold piece 821 is held fast to the movable platen 120. The second support part 823 supports the second cooling part 822 such that the second cooling part 822 can move relative to the movable platen 120. The second cooling part 822 is positioned in the space between the second mold piece 821 and the movable platen 120. Note that, as will be described later in detail, the second cooling part 822 may be held fast to the movable platen 120 as shown in FIG. 4. In that case, the second support part 823 supports the second mold piece 821 such that the second mold piece 821 can move relative to the movable platen 120. The second cooling part 822 and the second mold piece 821 have only to be able to move relative to each other in both of the mold opening/closing directions.

Both the second mold piece 821 and the second cooling part 822 may be shaped like a plate that is perpendicular to the mold opening/closing directions. Viewing from the mold opening/closing directions, it is preferable if the second cooling part 822 has a size equal to or larger than that of the second mold piece 821, in order to cool down the entirety of the second mold piece 821. The second support part 823 may be shaped like a rod that is parallel to the mold opening/closing directions. The second support part 823 is inserted in a through-hole 822*a* that penetrates the second cooling part 822 in the mold opening/closing directions. Multiple second support parts 823 may be provided. The second support part 823 is held fast to the movable platen 120, and the second cooling part 822 moves along the second support part 823. The second support part 823 is compressed in the mold opening/closing directions when the molds are clamped together, and transmits the mold-clamping force. Multiple second support parts 823 may be provided to transmit the mold-clamping force to the entire second mold piece 821 evenly. The second support parts 823 are provided, for example, respectively at each of the four corners of the second mold piece 821.

As shown in FIG. 3A and FIG. 3B, the second cooling part 822 and the second mold piece 821 may be parted when the molding material is injected. That is, in the filling step, the second cooling part 822 and the second mold piece 821 may be separated. A space is then formed between the second cooling part 822 and the second mold piece 821, which prevents or substantially prevents the heat from transmitting. Compared to when the second cooling part 822 and the second mold piece 821 are in contact with each other, the temperature of the second mold piece 821 is high, and the temperature of the wall surface of the cavity space 801 is high. As a result of this, when the molding material is injected, the molding material has excellent fluidity, and the shape and dimensions of the cavity space 801 are easily transferred to the molded article. In other words, the mold device 800 achieves excellent transfer performance. It is therefore not necessary to heat the second mold piece 821 with a heating device in order to improve the transfer performance of the mold device 800 when injecting the molding material. However, the second mold piece 821 may be heated with a heating device when the molding material is injected. In either case, the temperature of the second mold piece 821 is higher and the temperature of the wall surface of the cavity space 801 is higher than when the second cooling part 822 and the second mold piece 821 are in contact with each other.

It is preferable if the second cooling part 822 and the second mold piece 821 are separated from each other at least from the beginning to the end of the filling step. It is more preferable if the second cooling part 822 and the second mold piece 821 are separated from each other at least during part of (preferably throughout) the pressure-maintaining step following the filling step. If the temperature of the second mold piece 821 is high during the pressure-maintaining step, it is easier to replenish the molding material that is insufficient due to the cooling and contraction occurring in the cavity space 801.

As shown in FIG. 3C, the second cooling part 822 and the second mold piece 821 may contact each other while the molding material cools down. That is, the second cooling part 822 and the second mold piece 821 may contact each other during the cooling step. The second cooling part 822 removes heat from the second mold piece 821 by contacting the second mold piece 821. As a result of this, the second mold piece 821 can be cooled down; the cooling time it takes for the molding material to solidify until it can be removed from the mold device 800 can be shortened. In particular, when the molded article is a thick thing such as a lens, the cooling time may be shortened significantly.

For example, when the pressure-maintaining step switches to the cooling step, the second cooling part 822 and the second mold piece 821 are moved relative to each other, from positions where they are separated from each other to positions where they are in contact with each other. Note that the second cooling part 822 and the second mold piece 821 may come into contact with each other while the cooling step is still in progress. Even if the second cooling part 822 and the second mold piece 821 come into contact with each other halfway through the cooling step, it is still possible to shorten the cooling time.

In this embodiment, the second mold piece 821 and the second cooling part 822 are moved relative to each other in the mold opening/closing directions. Unlike when the second cooling part 822 is moved in directions perpendicular to the mold opening/closing directions as in related art, the present embodiment makes it possible to prevent or substantially prevent the second mold piece 821 from cooling down unevenly in directions perpendicular to the mold opening/closing directions (to be more specific, in the mold-clamping direction). Doing so leads to reduced variability in the molded article's contraction and reduced distortion of the molded article, so that the accuracy of transfer from the second mold piece 821 to the molded article improves.

The second cooling part 822 has inner flow paths **822*b* through which the coolant flows. The coolant is adjusted to a set temperature in advance by a temperature adjustment device (not shown). The temperature adjustment device and the mold device 800 are connected by outbound piping and return piping. The coolant is supplied to the flow paths 822*b* via the outbound piping. After flowing through the flow paths 822*b*, the coolant returns to the temperature adjustment device via the return piping. The set temperature of the temperature adjustment device is set lower than the temperature of the second mold piece 821** as of when the molding material is injected. The coolant is, for example, water or oil.

In order to prevent or substantially prevent the second mold piece 821 from cooling down unevenly in directions perpendicular to the mold-clamping direction, it is preferable to lay out the flow paths **822*b* so as to surround the center part of the second mold piece 821 when viewed from the mold-clamping direction. For example, it is preferable to lay out the flow paths 822*b* so as to sandwich the center part of the second mold piece 821 in the Z-axis direction when viewed from the mold-clamping direction. It is also preferable to lay out the flow paths 822*b* so as to sandwich the center part of the second mold piece 821** in the Y-axis direction when viewed from the mold-clamping direction.

It is preferable to adjust the first cooling part 812 and the second cooling part 822 to the same temperature. This allows the molded article to be cooled down evenly from both sides in directions in which the molds are open and close, leading to reduced variability in the molded article's contraction and reduced distortion of the molded article, so that the accuracy of transfer from the first mold piece 811 and the second mold piece 821 to the molded article improves. However, the first cooling part 812 and the second cooling part 822 may be adjusted to different temperatures insofar as the accuracy of transfer can be improved. The control device 700 may obtain information about the shape and dimensions of the molded article, and set, suggest, or adjust the temperatures of the first cooling part 812 and the second cooling part 822 based on that information.

The movable mold 820 may have a second back surface part 825. The second back surface part 825 is positioned on the opposite side of the fixed mold 810 with respect to the second mold piece 821. The second back surface part 825 may be shaped like a plate that is perpendicular to the mold opening/closing directions. The second back surface part 825 and the second mold piece 821 are positioned at an interval in the mold opening/closing directions. The second cooling part 822 is provided in the space between the second back surface part 825 and the second mold piece 821 such that the second cooling part 822 can move in both of the mold opening/closing directions. Also, a second support part 823 is provided in the space between the second back surface part 825 and the second mold piece 821.

The movable mold 820 may have a second spacer part 827 and a second attachment part 828 between the second back surface part 825 and the movable platen 120. The second spacer part 827 is provided with a frame-like shape on the opposite side of the fixed mold 810 with respect to the second back surface part 825, forming a space between the second back surface part 825 and the second attachment part 828. The ejector plate 826 is provided in this space such that it can move in both of the mold opening/closing directions. The second attachment part 828 is attached to the movable platen 120. The second attachment part 828 may be shaped like a plate that is perpendicular to the mold opening/closing directions.

The movable mold 820 may have a second drive part 829. The second drive part 829 moves the second cooling part 822 and the second mold piece 821 relative to each other.

The second drive part 829 may be, for example, an air cylinder, a hydraulic cylinder, or an electric motor. Note that the second drive part 829 need not be a part of the movable mold 820 and may be a part of the injection molding machine 10 instead. Also, for the first drive part 819, it is possible to use an existing device provided in the injection molding machine 10 such as the mold-clamping motor 160 of the mold-clamping device 100 or the drive mechanism 220 of the ejector device 200 shown in FIG. 1 and FIG. 2.

Note that, although the second cooling part 822 and the second support part 823 are provided in the movable mold 820 in this embodiment, they may be provided in the injection molding machine 10 instead. Furthermore, the second cooling part 822 and the second support part 823 may be provided between the movable mold 820 and the movable platen 120. The second cooling part 822 and the second mold piece 821 have only to be able to move relative to each other in both of the mold opening/closing directions, between positions where they are spaced apart and positions where they are in contact with each other. The second mold piece 821 is provided in the movable mold 820.

Next, a mold device 800 according to a first modification of the present disclosure will be described with reference to FIG. 4. The following description will mainly focus on differences from the above embodiment. According to this modification, the mold-clamping motor 160 of the mold-clamping device 100 shown in FIG. 1 and FIG. 2 moves the second cooling part 822 and the second mold piece 821 relative to each other. The movable mold 820 of this modification has a second preloading part 824. When the molds are clamped together, the second preloading part 824 preloads the second mold piece 821 in the direction in which the molds close (the positive X-axis direction) relative to the second cooling part 822. The second preloading part 824 is, for example, a coil spring that is compressed when the molds are clamped together. Its elastic restoring force preloads the second mold piece 821 in the direction in which the molds close (the positive X-axis direction) relative to the second cooling part 822.

The second cooling part 822 is held fast to the movable platen 120, and the second support part 823 supports the second mold piece 821 such that the second mold piece 821 can move relative to the movable platen 120. The second preloading part 824 has, for example, one end held fast to the second support part 823 and the other end held fast to the second mold piece 821. The second mold piece 821 has a guiding hole 821*a*, in which the second support part 823 is inserted. The second preloading part 824 is also inserted in the guiding hole 821*a*. Note that the second preloading part 824 may have one end held fast to the second cooling part 822 and the other end held fast to the second mold piece 821.

Figures 4A, 4B, 4C:
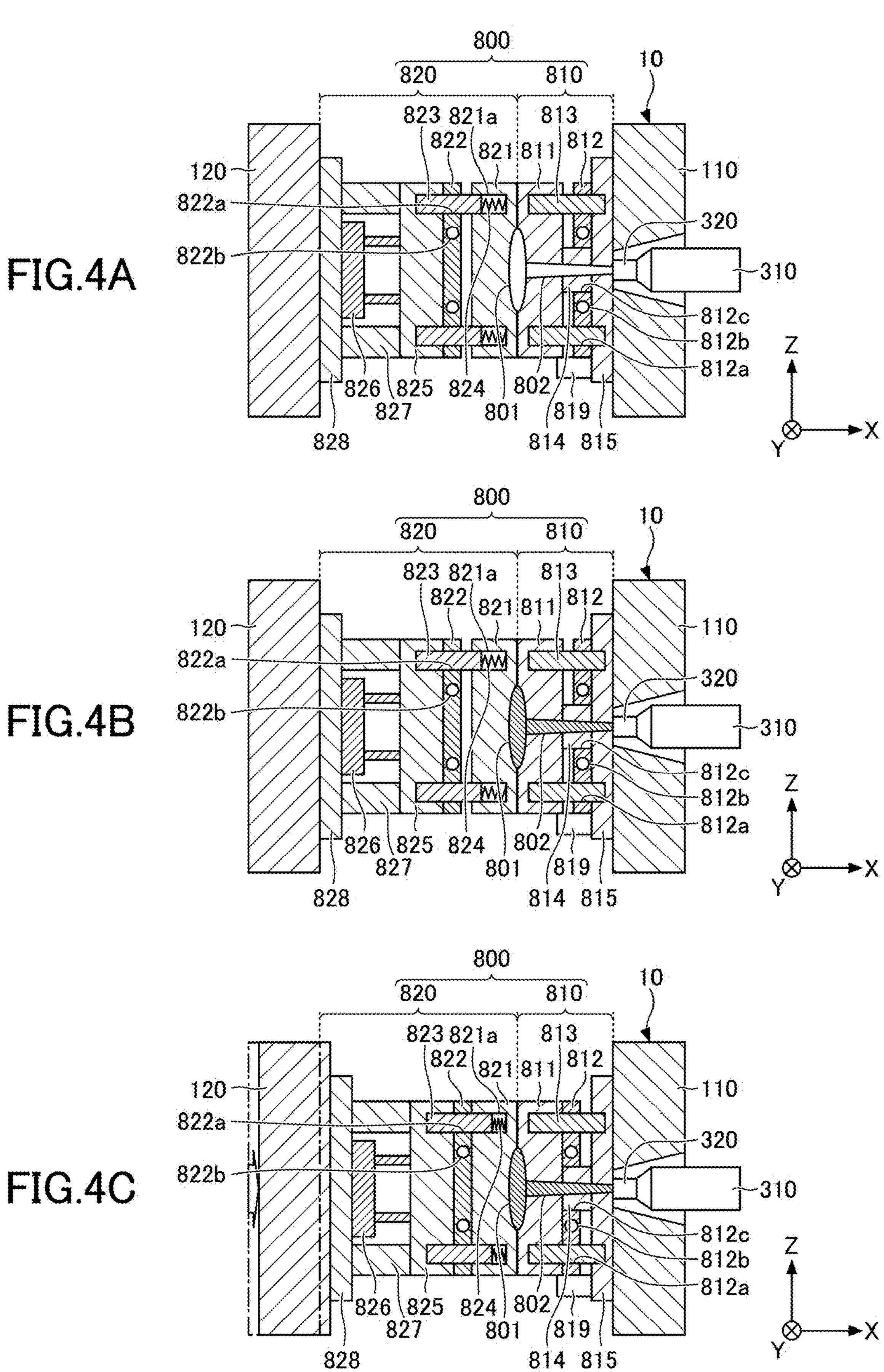
FIG. 4A is a cross-sectional view that shows a state in which filling of a mold device according to a first modification of the present disclosure begins.
FIG. 4B is a cross-sectional view that shows a state in which filling of a mold device according to a first modification of the present disclosure ends.
FIG. 4C is a cross-sectional view that shows a state in which a mold device according to a first modification of the present disclosure is cooled down.

When the molds are clamped together, the mold-clamping motor 160 of the mold-clamping device 100 moves the movable platen 120 forward, up to a desired position, against the elastic restoring force of the second preloading part 824. As shown in FIG. 4A and FIG. 4B, the second cooling part 822 and the second mold piece 821 may be separated when the molding material is injected. Subsequently, when the mold-clamping motor 160 moves the movable platen 120 further forward, the second cooling part 822 and the second mold piece 821 come into contact with each other. As shown in FIG. 4C, the first cooling part 812 and the first mold piece 811 may contact each other while the molding material cools down.

Note that, although not illustrated, the fixed mold 810 may have a first preloading part. When the molds are clamped together, the first preloading part preloads the first mold piece 811 relative to the first cooling part 812 in the direction in which the molds open (the negative X-axis direction). The first cooling part 812 is held fast to the fixed platen 110, and the first support part 813 supports the first mold piece 811 such that the first mold piece 811 can move relative to the fixed platen 110. In this case, too, the mold-clamping motor 160 of the mold-clamping device 100 can move the first cooling part 812 and the first mold piece 811 relative to each other.

Next, a mold device 800 according to a second modification of the present disclosure will be described with reference to FIG. 5. The following description will mainly focus on differences from the embodiment and the first modification described above. According to this modification, as shown in FIG. 5A, when the first cooling part 812 and the first mold piece 811 are separated from each other, the first cooling part 812 and the first cylindrical part 814 are separated from each other. Furthermore, as shown in FIG. 5B, when the first cooling part 812 and the first mold piece 811 come into contact with each other, the first cooling part 812 and the first cylindrical part 814 come into contact with each other.

The first cylindrical part 814 is inserted in a through-hole 812*c* that penetrates the first cooling part 812 in the mold opening/closing directions. The diameter of the through-hole 812*c* in the first cooling part 812 becomes larger as the through-hole 812*c* extends further in the direction in which the molds open (the negative X-axis direction). On the other hand, the outer diameter of the first cylindrical part 814 increases as the first cylindrical part 814 extends further in the direction in which the molds open. When the first cooling part 812 moves in the direction in which the molds open, the first cooling part 812 and the first cylindrical part 814 come into contact with each other. Also, when the first cooling part 812 moves in the direction in which the molds close, the first cooling part 812 and the first cylindrical part 814 are separated from each other.

Figures 5A, 5B:
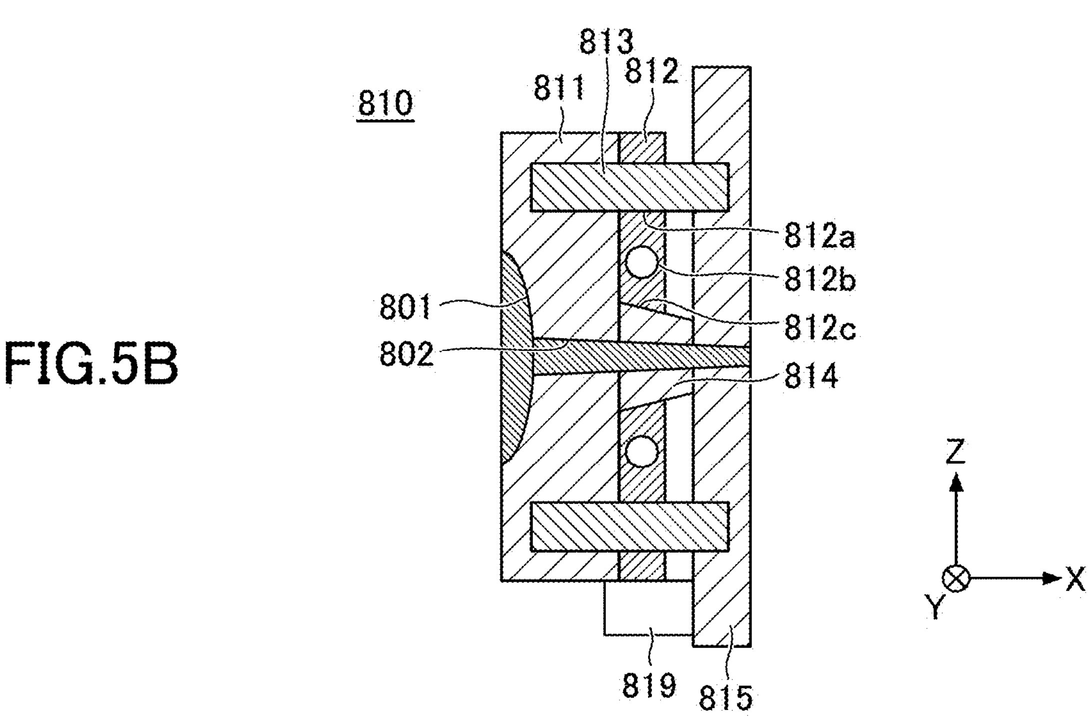
FIG. 5A is a cross-sectional view that shows a state in which filling of a mold device according to a second modification of the present disclosure ends.
FIG. 5B is a cross-sectional view that shows a state in which a mold device according to a second modification of the present disclosure is cooled down.

As shown in FIG. 5A, when the molding material is injected, not only the first cooling part 812 and the first mold piece 811 are separated from each other, but the first cooling part 812 and the first cylindrical part 814 are also separated from each other. A space is then formed between the first cooling part 812 and the first cylindrical part 814, which prevents or substantially prevents the heat from transmitting. Compared to when the first cooling part 812 and the first cylindrical part 814 contact each other, the temperature of the first cylindrical part 814 is high, and the fluidity of the molding material in the sprue 802 is excellent. Note that, when the molding material is injected, a heat insulating material may be provided in the space between the first cooling part 812 and the first cylindrical part 814.

As shown in FIG. 5B, when the molding material cools down, not only the first cooling part 812 and the first mold piece 811 are in contact with each other, but the first cooling part 812 and the first cylindrical part 814 are also in contact with each other. The first cooling part 812 removes heat from the first cylindrical part 814 by contacting the first cylindrical part 814. As a result of this, the first cylindrical part 814 can be cooled down; the cooling time it takes for the molding material to solidify until it can be removed from the mold device 800 can be shortened.

Although mold devices and injection molding systems according to an embodiment, examples, and modifications of the present disclosure have been described above, the present disclosure is by no means limited to these embodiment, examples, and modifications. Various changes, alterations, substitutions, additions, deletions, and combinations are possible within the scope of the accompanying claims. Naturally, they also fall within the technical scope of the present disclosure.

What is claimed is:

1. A mold device comprising a fixed mold and a movable mold and forming a cavity space between the fixed mold and the movable mold when the fixed mold and the movable mold are clamped together, wherein the cavity space is a space to be filled with a pre-heated molding material, wherein the fixed mold includes:

a first mold piece that, when the fixed mold and the movable mold are clamped together, contacts the movable mold and forms a part of a wall surface of the cavity space;

a first cooling part that is adjusted to a temperature lower than a temperature of the first mold piece observed at a time of injecting the molding material into the cavity space; and a first support part that movably supports one of the first cooling part and the first mold piece relative to another one of the first cooling part and the first mold piece, wherein the first cooling part and the first mold piece are movable relative to each other, in both mold opening and closing directions, between positions at which the first cooling part and the first mold piece are spaced apart and positions at which the first cooling part and the first mold piece are in contact with each other, wherein the movable mold includes:

a second mold piece that, when the fixed mold and the movable mold are clamped together, contacts the fixed mold and forms a part of the wall surface of the cavity space;

a second cooling part that is adjusted to a temperature lower than a temperature of the second mold piece observed at a time of injecting the molding material into the cavity space; and a second support part that movably supports one of the second cooling part and the second mold piece relative to another one of the second cooling part and the second mold piece, and wherein the second cooling part and the second mold piece are movable relative to each other, in both of the mold opening and closing directions, between positions at which the second cooling part and the second mold piece are spaced apart and positions at which the second cooling part and the second mold piece are in contact with each other.

2. The mold device according to claim 1, wherein the movable mold includes a second drive part configured to move the second cooling part and the second mold piece relative to each other.

3. The mold device according to claim 1, wherein the movable mold includes a preloading part configured to preload the second mold piece in a direction in which the fixed mold and the movable mold close, relative to the second cooling part, when the fixed mold and the movable mold are clamped together.

4. The mold device according to claim 1, wherein the first support part and the second support part transmit a mold-clamping force.

5. The mold device according to claim 1, wherein the fixed mold includes a first cylindrical part formed such that a part of a sprue for delivering the molding material into the cavity space penetrates the first cylindrical part, wherein the first cooling part and the first cylindrical part are separated from each other when the first cooling part and the first mold piece are separated from each other, and wherein the first cooling part and the first cylindrical part come into contact with each other when the first cooling part and the first mold piece come into contact with each other.

6. An injection molding system comprising:

a mold device including a fixed mold and a movable mold and forming a cavity space between the fixed mold and the movable mold when the fixed mold and the movable mold are clamped together; and an injection molding machine configured to inject a pre-heated molding material into the cavity space in the mold device, wherein the fixed mold includes a first mold piece that, when the fixed mold and the movable mold are clamped together, contacts the movable mold and forms a part of a wall surface of the cavity space, wherein the fixed mold or the injection molding machine includes:

a first cooling part that is adjusted to a temperature lower than a temperature of the first mold piece observed at a time of injecting the molding material into the cavity space; and a first support part that movably supports one of the first cooling part and the first mold piece such that one of the first cooling part and the first mold piece relative to another one of the first cooling part and the first mold piece, wherein the first cooling part and the first mold piece are movable relative to each other, in both mold opening and closing directions, between positions at which the fixed mold and the movable mold are spaced apart and positions at which the fixed mold and the movable mold are in contact with each other, wherein the movable mold includes:

a second mold piece that, when the fixed mold and the movable mold are clamped together, contacts the fixed mold and forms a part of the wall surface of the cavity space, wherein the fixed mold or the injection molding machine includes:

a second cooling part that is adjusted to a temperature lower than a temperature of the second mold piece at a time of injecting the molding material into the cavity space; and a second support part that movably supports one of the second cooling part and the second mold piece relative to another one of the second cooling part and the second mold piece, and wherein the second cooling part and the second mold piece are movable relative to each other, in both of the mold opening and closing directions, between positions at which the fixed mold and the movable mold are spaced apart and positions at which the fixed mold and the movable mold are in contact with each other.

* * * * *